(12) United States Patent
Zhang et al.

(10) Patent No.: US 11,947,532 B2
(45) Date of Patent: Apr. 2, 2024

(54) LIFECYCLE TRACKING OF DATA OBJECTS

(71) Applicant: Salesforce, Inc., San Francisco, CA (US)

(72) Inventors: Rui Zhang, Fremont, CA (US); Douglas Doole, Livermore, CA (US); Abhijith Anilkumar, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/929,079

(22) Filed: Sep. 1, 2022

(65) Prior Publication Data
US 2024/0078227 A1    Mar. 7, 2024

(51) Int. Cl.
*G06F 16/24*    (2019.01)
*G06F 9/48*     (2006.01)
*G06F 16/242*   (2019.01)
*G06F 16/2455*  (2019.01)

(52) U.S. Cl.
CPC .......... *G06F 16/2448* (2019.01); *G06F 9/485* (2013.01); *G06F 16/24552* (2019.01)

(58) Field of Classification Search
CPC ................. G06F 16/2448; G06F 16/24552
See application file for complete search history.

(56) References Cited

U.S. PATENT DOCUMENTS

| 7,383,277 | B2 * | 6/2008 | Gebhard | G06Q 30/04 705/28 |
| 7,584,232 | B2 * | 9/2009 | Guo | G06F 12/0269 |
| 2007/0083550 | A1 | 4/2007 | Ferguson | |

* cited by examiner

*Primary Examiner* — Baoquoc N To
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to managing data objects. A computer system may access a first application comprising a set of functions and may execute a second application to facilitate execution of the first application. The first application may be written in a different programming language than the second application. The second application may manage, on behalf of the first application, memory resources of data objects that are defined within ones of the set of functions of the first application. The second application may establish, for the data objects, ownership information that indicates which ones of the functions are utilizing the data objects. The ownership information may be usable to determine, upon completion of a function of the set of functions, whether a given one of the data objects can be deallocated based on whether the given data object is being utilized by another function.

20 Claims, 9 Drawing Sheets

LIFECYCLE TRACKING OF DATA OBJECTS

BACKGROUND

Technical Field

This disclosure relates generally to computer systems and, more specifically, to various mechanisms for managing memory resources provisioned for data objects.

Description of the Related Art

Computer systems typically execute many applications to provide various functionality to users and other systems that interact with the computer systems. Applications can be written in a variety of different programming languages that have respective formal rules that govern how those applications can be composed. For example, an application could be written using C++, Java, Python, etc., each having their own syntax and semantics. Once the program code for an application has been written, the program code can then be compiled and executed. That program code includes functions that implement the functionality of the application, and those functions specify variables that are used to store data and allow for that data to be manipulated within those functions.

DETAILED DESCRIPTION

Figure 1:
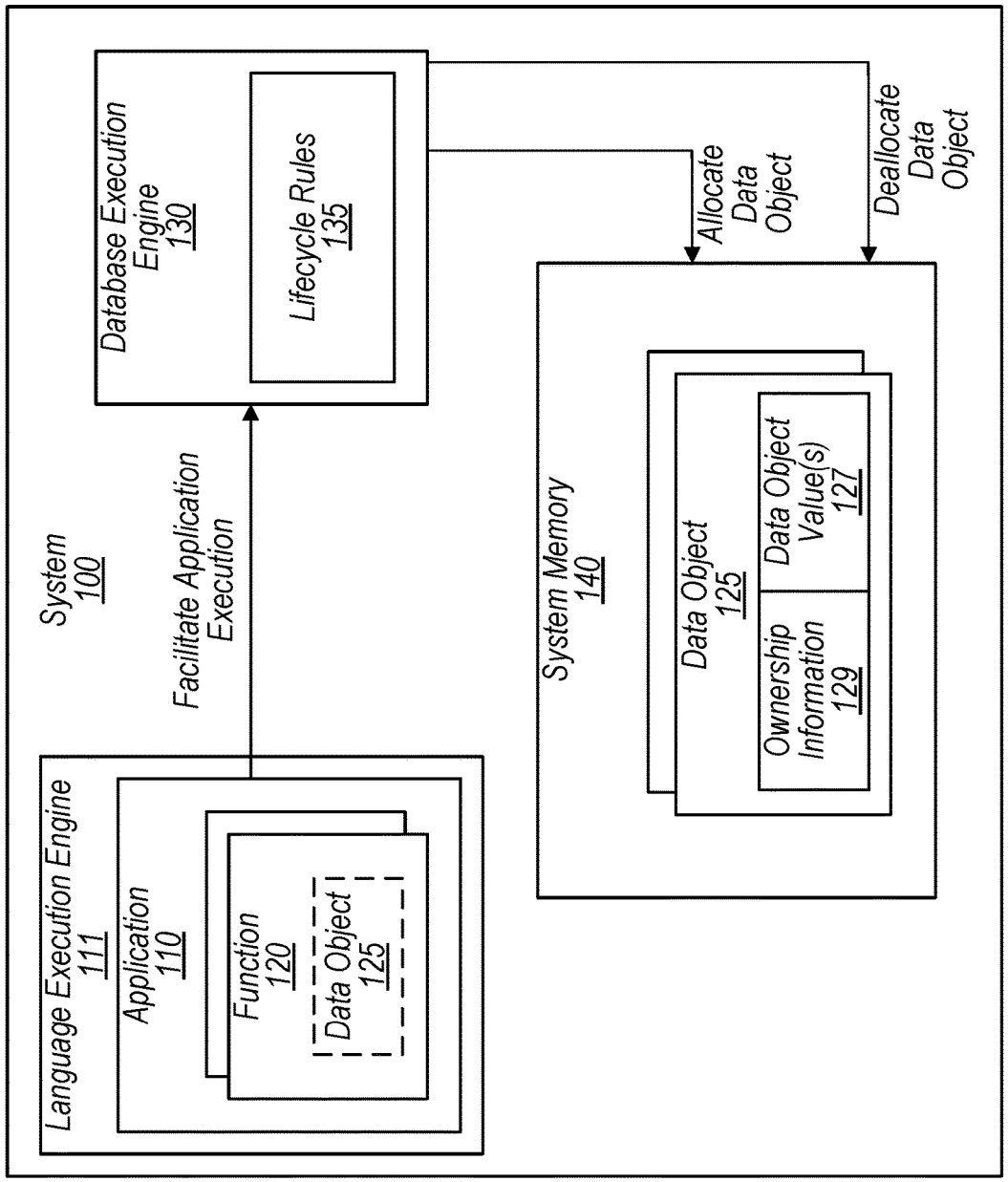
FIG. 1 is a block diagram illustrating example elements of a system having applications and a database execution engine that is responsible for allocating, for an application, data objects having ownership information, according to some embodiments.

In many cases, it may be desirable for an application to interact with a database system in order to access and store data for a database. Traditional programming languages (e.g., C++, Java, etc.) do not provide native support for declaring database queries (e.g., SQL statements) within functions defined using those languages. But a programming language can be used that provides native database access (e.g., by being built into a database engine) by allowing for functions in an application to have database queries that can be executed against a database. Values can be passed into database queries to be persisted in the database and values stored in the database can be fetched using database queries and then consumed within a function of the application. Furthermore, values managed by one function can be passed into other functions via function calls and returned via return statements. In order to permit database queries to be defined and used in a function, in various embodiments described herein, a database execution engine is used that can facilitate the execution of applications developed under a programming language that allows database queries in functions. While a database execution engine is discussed, other types of execution engines can be used. The database execution engine facilitates the execution of an application by executing one or more functions defined in another programming language that can be used to implement the more complex operations (e.g., database queries) of the other programming language. For example, an assignment operation defined using the programming language that allows for database queries may be implemented using a set of functions that is defined using the C programming language. When a database query specified using the former programming language is executed by an associated language execution engine, the database execution engine invokes one or more functions to implement the underlying set of operations for carrying out that database query.

But, in many cases, the developers that write the functions for an application developed under a programming language that allows database queries are not provided the capability to manage the allocation/deallocation of memory for data objects (or variables) defined in those functions. Instead, this responsibility falls to the database execution engine. Thus, when a data object is allocated and assigned a value in the higher-level application (the one developed under the programming language that allows for database statements), the database execution engine (which is referred to as a lower-level application) invokes functions of the database execution engine (that are defined using the different programming language, such as C/C++) to allocate memory for the data object and assign it the value. As such, the data object of the higher-level application is backed by memory resources managed by the functions of the execution engine. The data object, however, may be passed between functions of that higher-level application. Deleting the memory resources allocated for a data object at the wrong point by the database execution engine can cause errors as the database execution engine may prematurely delete a data object that was allocated for a first function but is still in use by a second function. It may thus be desirable to implement mechanisms to track the lifecycle and ownership of these data objects in order to ensure proper memory management. This disclosure addresses, among other things, the technical problem of how to ensure this proper memory management.

In various embodiments that are described below, a system includes an application that comprises a set of functions and a database execution engine that is executable to facilitate the execution of the former application. The functions included in the application may define data objects that can be used to store and manipulate data. During the execution of that application by an associated language execution engine, in various embodiments, the database execution engine allocates, in a memory of the system, memory resources for the data objects and then manages the memory resources on behalf of the application. To manage the memory resources, the database execution engine establishes ownership information indicating which application functions of the application are using an allocated data object. In various embodiments, the ownership information includes a function identifier (ID) for an application function that owns the corresponding data object and/or a reference count that identifies the number of application functions that share ownership of that data object. Thus, when a data object is used/referenced, this use is reflected in the ownership information to prevent the data object from being deleted prematurely. For example, if a data object is passed from a first function into a second function, the reference count may be incremented to indicate that the data object is being shared between those two functions. When the use of the data object by an application function is finished, the ownership information can be updated by the database execution engine to indicate that there is one less owner or that the data object is not being used—when the ownership reference count reaches zero—and can be deleted. In various embodiments, upon completion of an application function, the database execution engine uses the ownership information of a given data object to determine whether that data object can be deallocated based on whether it is being utilized by another application function of the application. If the ownership information indicates that the data object can be deleted, then the database execution engine may reclaim the memory resources used for that data object.

These techniques may be advantageous over prior approaches as these techniques allow proper memory management of data objects that are allocated and managed by one application on behalf of another application. For example, by tracking the ownership of a data object, the database execution engine can ensure that the data object is not deleted prematurely or persisted longer than it should be. As a result, the application that requested the allocation of memory resources for the data object may not suffer a memory error if the data object is deleted at the appropriate time. Furthermore, the memory resources can be reclaimed and used for other purposes instead of the data object holding those memory resources for a long period of time without being used by any function. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a set of applications 110, a language execution engine 111, a database execution engine 130, and a system memory 140. As further illustrated, an application 110 includes a set of functions 120 that define data objects 125, database execution engine 130 includes a set of lifecycle rules 135, and system memory 140 includes a set of data objects 125 having data object values 127 and ownership information 129. In some embodiments, system 100 is implemented differently than shown. For example, the ownership information 129 of a data object 125 may be stored separately from that data object 125.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure provided by a cloud provider. Thus, applications 110, language execution engine 111, and/or database execution engine 130 may utilize the available cloud resources of that cloud infrastructure (e.g., computing resources, storage resources, etc.) to facilitate their operation. For example, database execution engine 130 might execute in a virtual environment that is hosted on server-based hardware included in a datacenter. But in some embodiments, system 100 is implemented using a local or private infrastructure as opposed to a public cloud In various embodiments, system 100 maintains a database (not shown) that stores data for system 100. The data may include records that each comprise data and a database key that is usable to look up that record. For example, a record may correspond to a row in a database table where the record specifies values for attributes of the database table. Records may include data about users (e.g., customers) of a tenant and their interactions and relationships with the tenant. That data may be used to enhance the tenant's interactions with those users. As such, in various embodiments, applications 110 are developed under a programming language that allows for the applications to include database statements so that those application can interface with the database in order to permit tenants to store and access their data at the database.

An application 110, in various embodiments, is a set of software routines executable to provide certain functionality to users and other entities that interact with system 100. Examples of applications 110 include a customer relationship management (CRM) application, a content streaming application, an email application, and a user-provided application (as opposed to an application that is provided by a provider of system 100). As illustrated in FIG. 1, an application 110 can include a set of functions 120 that implement the functionality of that application 110. A function 120, in various embodiments, is a block of code that can be executed to accomplish a specific task/procedure. In some embodiments, a function 120 can facilitate the execution of logic on a database by permitting SQL statements (or other statement types) to be executed in that function 120. Values can be passed into the SQL statements to be persisted in the database and values stored within the database can be fetched from those SQL statements and consumed within that function 120. Moreover, values managed by a function 120 may be passed to other functions 120 via function calls or returned via return statements. In various embodiments, a function 120 also includes a number of operators that can perform computations on values. For instance, an "assign" operator can copy a value from a source data object 125 to a destination data object 125. As another example, an "if" operator can evaluate the condition(s) specified in an if statement and direct the execution to the corresponding code path. As discussed below, in various embodiments, the operators of a function 120 are implemented via a set of functions of database execution engine 130.

Language execution engine 110, in various embodiments, executes a given application 110 and interfaces with database execution engine 130 to facilitate a portion of that execution (e.g., allocating/deallocating data objects 125). When a particular language construct, such as an assignment operation, is encountered, language execution engine 110 may interact with database execution engine 130 to cause it to execute one or more functions (which might be written in a different programming language) to implement the assignment operation. As such, database execution engine 130 manages the allocation of data objects 125 and transfer of ownership of those data objects 125 between variables and functions 120.

A data object 125, in various embodiments, is a data structure that can be used to store one or more data object values 127. As an example, a data object 125 may be an "integer" data object 125 that stores an integer as a data object value 125, a "string" data object 125 that stores a series of characters as a data object value 127, a "row" data object 125 that stores a row of a table as a set of data object values 127, etc. As a part of executing a function 120, one or more data objects 125 may be allocated and utilized by one or more functions 120 of an application 110. To allocate a data object 125, database execution engine 130 may provision memory resources in system memory 140 (which may be a volatile memory (e.g., dynamic random-access memory) or a non-volatile memory (e.g., NAND flash memory)) that can be used to store the information of that data object 125, such as its data object value(s) 127 and ownership information 129.

In various embodiments, there are four general categories of data objects 125. The first category of data object 125 is a "local" variable that is declared explicitly in a function 120 and exists within the scope of that function's execution. That local variable may belong only to that function 120 and thus be deleted by the time the function's execution has completed. An example of database execution engine 130 managing a local variable data object 125 is discussed in more detail with respect to FIG. 3. The second category of data object 125 is a "return" data object 125 that is constructed within a function's execution and returned by that function 120 to another function 120. An example of database execution engine 130 managing a return data object 125 is discussed in more detail with respect to FIG. 4A. The third category of data object 125 is a "parameter" data object 125 that is passed into a function 120 via the function's parameters. A parameter data object 125 can be also categorized as an input and/or output parameter. An example of database execution engine 130 managing a parameter data object 125 is discussed in more detail with respect to FIG. 5. The fourth category of data object 125 is a "global" variable that can store data and can be accessed across executions of functions 120, acting as a global variable. An example of database execution engine 130 managing a global data object 125 is discussed in more detail with respect to FIG. 6. The deletion of a given data object 125 belonging to each of these categories can depend on its ownership information 129.

Ownership information 129, in various embodiments, describes the state of ownership of a corresponding data object 125. Ownership information 129 may indicate who (i.e., which function(s) 120) are utilizing a corresponding data object 125, or more broadly in some cases, how many functions 120 are utilizing that data object 125. In various embodiments, ownership information 129 is established as part of allocating the memory resources for the corresponding data object 125. For example, when a data object 125 is being allocated, database execution engine 130 may allocate the memory resources for that data object 125 and store, in the memory resources, a function identifier of the function 120 that requested/caused the allocation of that data object 125. When the data object 125 is then used/referenced, this use can be reflected in its ownership information 129 to prevent that data object 125 from being deleted. When a use is completed, the ownership information 129 can be updated to indicate that the data object 125 is not being used at the moment, such that it can be either deleted or used elsewhere, or is being used by one less function 120. An example of ownership information 129 is discussed in more detail with respect to FIG. 2.

Database execution engine 130, in various embodiments, is software that is executable to enable the execution of at least a portion of an application 110. Database execution engine 130 may also implement database operations (e.g., inserting database records into a database of system 100). To enable the execution of at least a portion of an application 110, database execution engine 130 may execute one or more functions that implement the functionality of functions 120 of an application 110. In particular, an application 110 may be written using a first programming language and database execution engine 130 is written using a second programming language. As such, constructs of the second programming language are used to implement constructs of the first programming language. For example, a function 120 of an application 110 may include an "assign" operator that copies a value from a source data object 125 to a destination data object 125. That assign operator is defined in that function 120 using the second programming language but the implementation of the assign operator is defined using the first programming language. As a result, in various embodiments, when the function 120 of that application 110 is executed and the assign operator is reached as part of the execution path, database execution engine 130 executes one or more functions defined under the second programming language to copy the data object value(s) 127 from the source data object 125 to the destination data object 125.

To correctly manage data objects 125 and their allocated memory resources, in various embodiments, database execution engine 130 includes lifecycle rules 135 that ensure that the lifecycles or scopes of those data objects are accurately handled by database execution engine 130. The lifecycle of a data object 125 pertains to the duration for which the data object 125 can be accessed and can correspond to the execution of one function 120, the execution of a sequence of functions 120, or as long as system 100 persists. In various embodiments, lifecycle rules 135 are coded into database execution engine 130 and define how to manage ownership information 129. The lifecycle rules 135 can be categorized based on the types of data object 125. For example, there may be a lifecycle rule 135 for a return data object 125 that indicates that the ownership of that data object 125 is transferred from a first function 120 to a second function 120 when the execution of the first function 120 completes.

During the operation of system 100, system 100 may receive an execution request (e.g., from a user) to execute an application 110. Accordingly, system 100 may execute the requested application 110, using database execution engine 130 to facilitate at least a portion of that application's execution. As part of the execution of that application 110, database execution engine 130 may allocate data objects 125 on behalf of that application 110 and maintain ownership information 129 for those data objects 125 so that it can ensure that those data objects 125 are properly deleted. By doing so, database execution engine 130 can ensure proper memory management of memory resources allocated for the execution of that application 110.

Figure 2:
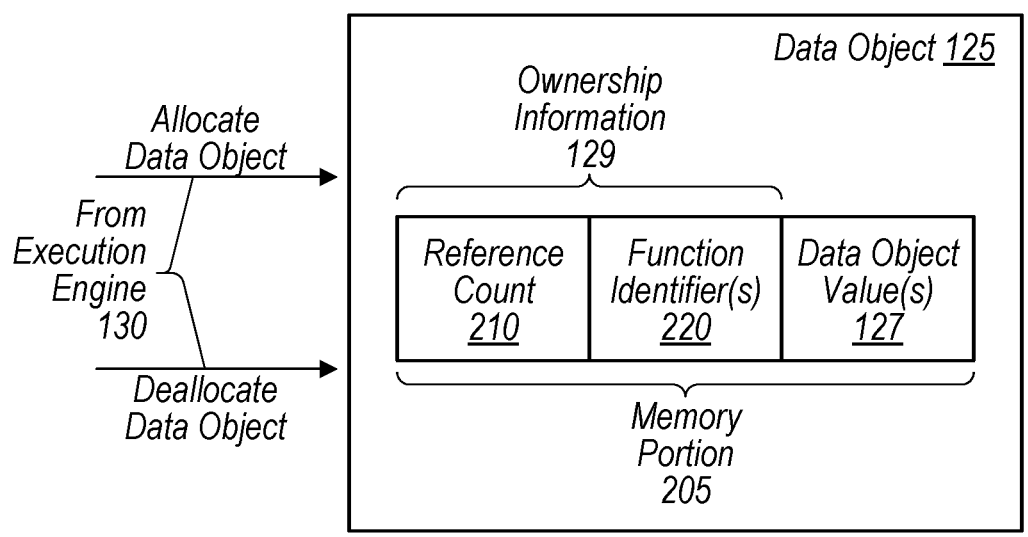
FIG. 2 is a block diagram illustrating example elements of a data object that includes a set of data values and ownership information, according to some embodiments.

Turning now to FIG. 2, a block diagram of a data object 125 that comprises a set of data object values 127 and ownership information 129 is shown. As shown, ownership information 129 includes a reference count 210 and a set of function identifiers 220. A data object 125 may be implemented differently than shown. For example, ownership information 129 may include only reference count 210 or a set of function identifiers 220. Whether ownership information 129 includes one or the other may depend on the type of data object 125 (e.g., return, parameter, etc.) that is allocated. In various embodiments, ownership information 129 is stored in a header portion of a memory portion 205. Memory portion 205, in various embodiments, corresponds to a portion of system memory 140 that is provisioned for storing information (e.g., data object values 127, ownership information 129, etc.) of a corresponding data object 125.

Reference count 210, in various embodiments, is a value that identifies the number of functions 120 that are utilizing a data object 125. When a data object 125 is allocated, in various embodiments, its reference count 210 is set to a default value (e.g., one, which corresponds to the function 120 that caused the allocation of that data object 125). When the ownership of that data object 125 is shared from one function 120 to another function 120 (e.g., by being passed to the latter function 120 as an input parameter), its reference count 210 is incremented. When a function 120 that shares that data object 210 has completed its execution, that reference count 210 is decremented. Accordingly, when that data object's reference count 210 reaches zero (or another number that indicates that no functions 120 are utilizing the data object 125), database execution engine 130 may deallocate that data object 125, reclaiming the memory portion 205 allocated for the data object 125.

A function identifier 220, in various embodiments, is an identifier that is assigned to a function 120 and can be used to reference that function 120. Consequently, when a data object 125 is allocated, its function identifier 220 may be set to the identifier of the function 120 that caused that data object 125 to be allocated. If the ownership of the data object 125 is transferred to another function 120 (e.g., as part of a return value), then its function identifier 220 may be set to the identifier of the new function 120. If a data object 125 is shared by functions 120, in some embodiments, its ownership information 129 includes multiple function identifiers 220 that each correspond to a respective function 120 that is utilizing the data object 125. In some cases, if a function identifier 220 is included for each function 120 that is utilizing a data object 125, then its ownership information 129 might not include reference count 210 as the number of functions 120 utilizing the data object 125 may be determined from the number of function identifiers 220.

Figure 3:
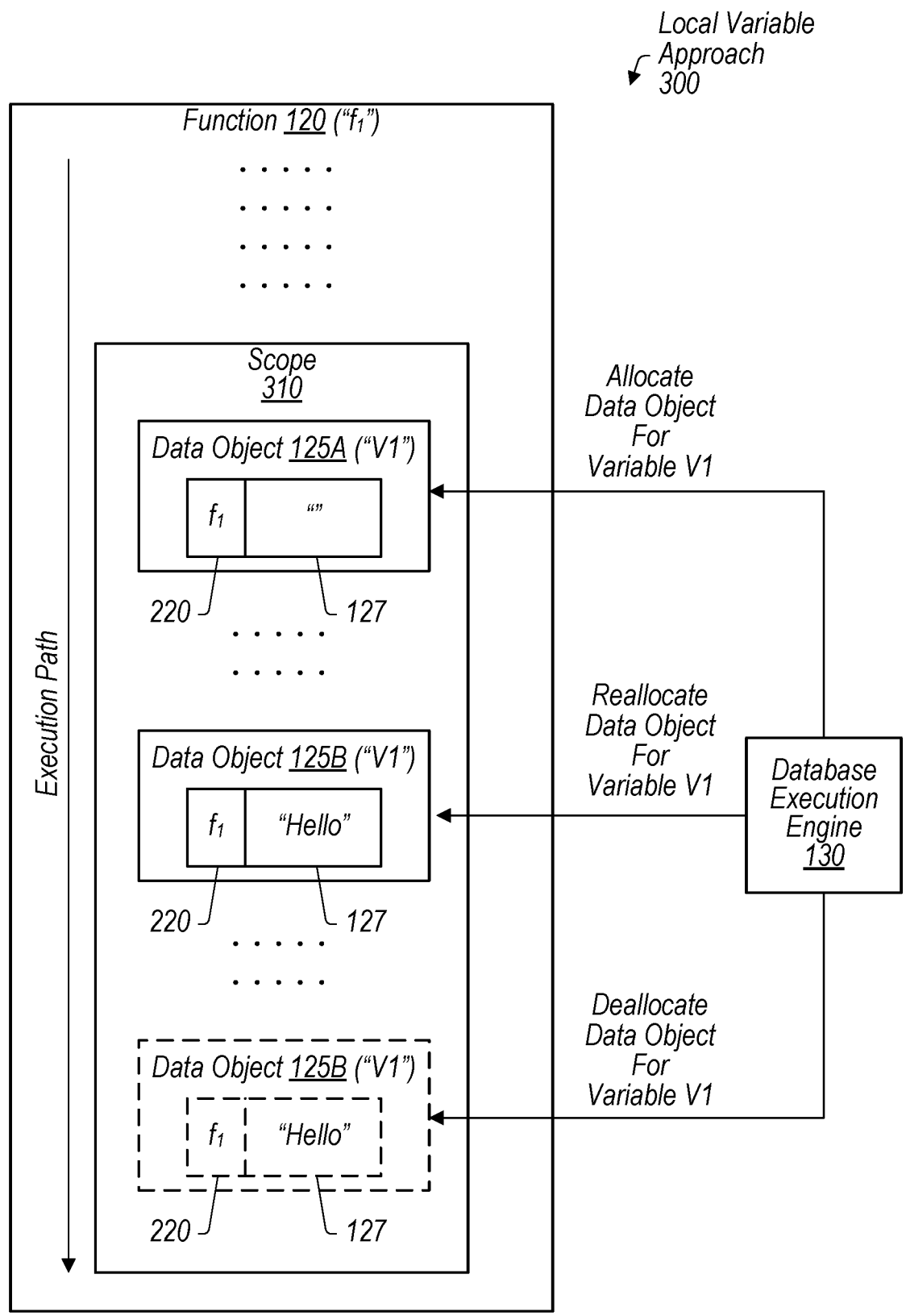
FIG. 3 is a block diagram illustrating example elements of managing a local data object defined in a function, according to some embodiments.

Turning now to FIG. 3, a block diagram of an example local variable approach 300 for managing a "local" data object 125 defined within a function 120 is shown. In the illustrated embodiment, there is a function 120 ("$f_1$") that comprises a scope 310. A scope 310, in various embodiments, defines a portion of program code in which an element (e.g., a variable, constant, etc.) can be defined, confined, and accessed under an identifier name. For example, the scope 310 of the illustrated embodiment might be a for-loop. As illustrated, during the execution of function 120 ("$f_1$") and in scope 310, a variable ("V1") is initialized. As part of the initialization of that variable, database execution engine 130 allocates a data object 125A ("V1") in system memory 140 and sets its data object value 127 to an empty string and its function identifier 220 to "$f_1$" to indicate that function 120 ("$f_1$") is an owner of data object 125A ("V1"). Based on scope 310 and lifecycle rules 135, database execution engine 130 may determine to include only a function identifier 220 in the ownership information 129 of data object 125A ("V1") and not a reference count 210.

As the execution of function 120 ("$f_1$") progresses, the string "Hello" is assigned to the variable ("V1") in the illustrated embodiment. In some cases, the memory resources allocated to a data object 125 are not sufficient for storing larger values. For example, the string "Hello" does not fit within the memory resources of data object 125A ("V1"). Accordingly, database execution engine 130 allocates a data object 125B ("V1") in system memory 140 and sets its data object value 127 to "Hello" and its function identifier 220 to "$f_1$" to indicate that function 120 ("$f_1$") is an owner of data object 125B ("V1"). The variable name "V1" (which is used to refer to its data object 125 in scope 310) remains the same, but the underlying data object 125 is changed from data object 125A to data object 125B. When reallocating a data object 125 for a variable, in various embodiments, the ownership information 129 of the prior data object 125 is applied to the new data object 125. Consequently, data object 125B inherits the ownership information 129 of data object 125A. If a second function 120 also owned data object 125A, then it would become an owner of data object 125B. As such, for a data object 125 that is expanded through such an assignment (i.e., the existing memory is enlarged to store the new data), the ownership of the affected memory does not change. Database execution engine 130 may also reclaim the memory resources of data object 125A ("V1") after allocating data object 125B ("V1").

When the execution with scope 310 is complete, variable ("V1") ceases to exist. That variable is destroyed with its underlying memory resource released. As such, database execution engine 130 deallocates data object 125B ("V1"). The scope of variable ("V1") and thus its data objects 125A and 122B is scope 310 and thus the lifecycle of the memory resources that are associated with that variable is confined to the execution within scope 310. As a result, the only owner of the data objects 125 allocated for variable ("V1") is function 120 ("$f_1$").

Figure 4A:
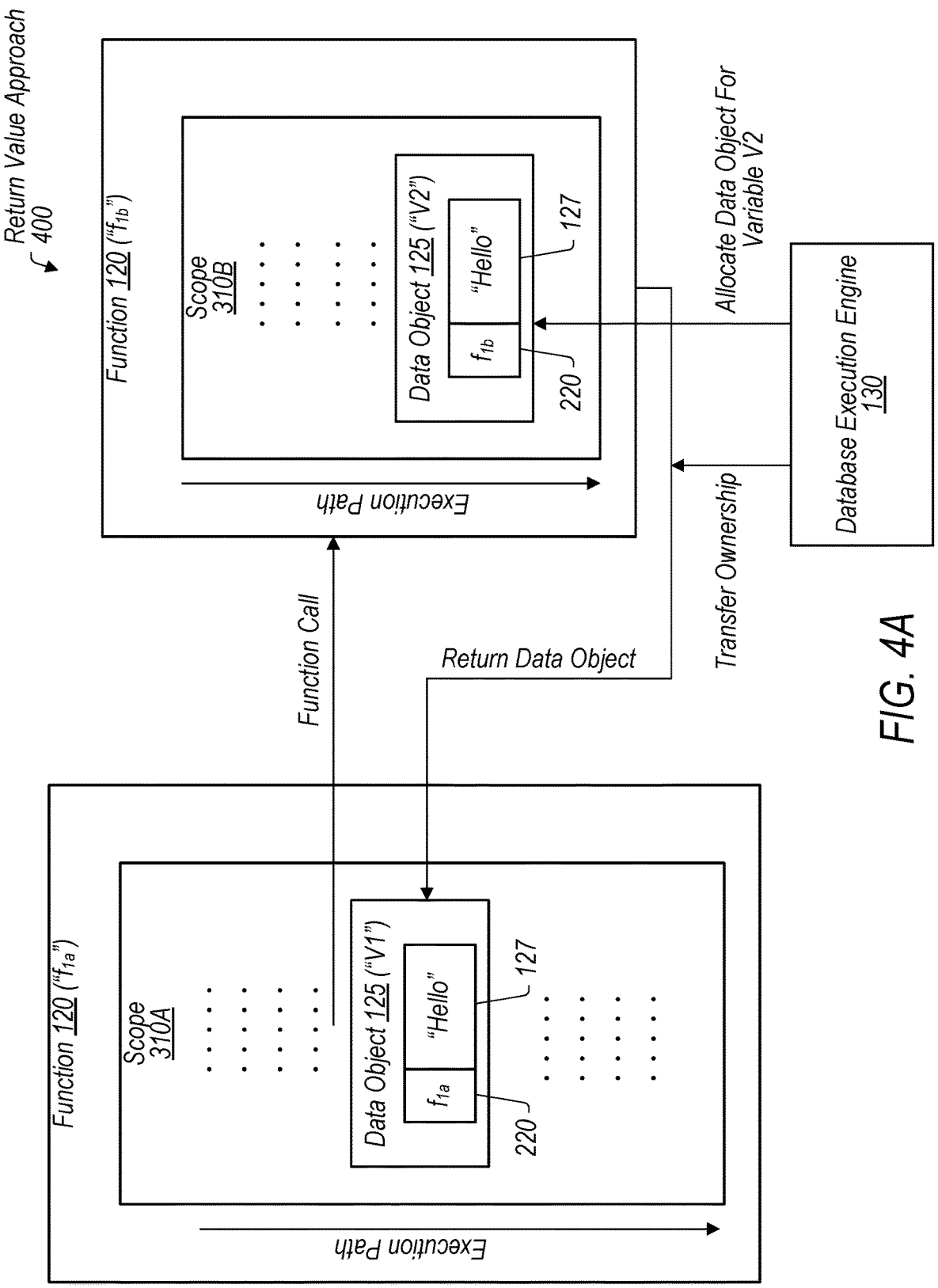
FIG. 4A is a block diagram illustrating example elements of managing a data object that is returned from a first function to a second function, according to some embodiments.

Turning now to FIG. 4A, a block diagram of an example return value approach 400 for managing a "return" data object 125 defined within a function 120 is shown. In the illustrated embodiment, there are two functions: a function 120 ("$f_{1a}$") having a scope 310A and a function 120 ("$f_{1b}$") having a scope 310B. A function 120 may return a data object 125 through a return statement when its execution terminates. The memory resources associated with the data object 125 are persisted as the data object 125 can be further used by the caller function 120. As such, the ownership of the data object 125 may be transferred to the caller function 120 at the callsite in the caller function 120.

As shown, during the execution of function 120 ("$f_{1a}$"), a function call occurs in scope 310A to execute function 120 ("$f_{1b}$"). During the execution of function 120 ("$f_{1b}$"), a variable ("V2") is initialized and thus database execution engine 130 allocates a data object 125 ("V2") in system memory 140 and sets its data object value 127 to "Hello" and its function identifier 220 to "$f_{1b}$" to indicate that function 120 ("$f_{1b}$") owns data object 125 ("V2"). Data object 125 ("V2") may be considered a local variable, but upon providing data object 125 ("V2") as a return value to function 120 ("$f_{1a}$"), the scope of data object 125 ("V2") is extended beyond the execution of function 120 ("$f_{1b}$")—its scope can include scope 310A. In various embodiments, an assign operator that invoked function 120 ("$f_{1b}$") transfers the ownership of data object 125 ("V2") to function 120 ("$f_{1a}$") from function 120 ("$f_{1b}$"). In particular, database execution engine 130 (which can implement the assign operator as discussed) may update the function identifier 220 of data object 125 ("V2") to the function identifier of function 120 ("$f_{1a}$"). As part of the assignment, that data object 125 can receive a different variable name. As shown for example, data object 125 ("V2") becomes data object 125 ("V1") when returned by function 120 ("$f_{1b}$") to function 120 ("$f_{1a}$").

When a data object 125 is returned to a function 120 or passed into a function 120, that data object 125 may be either copied (pass-by-value) or transferred (pass-by-reference). In the case of being copied, the data obtained from a returned or passed-in data object 125 is copied to a new data object 125 (that is, into a new memory portion 205) and assigned to the receiving function 120. For example, when data object 125 ("V2") is returned to function 120 ("$f_{1a}$"), a new data object 125 may be created (for variable ("V1")) and used to store the string "Hello." That new data object 125 is assigned to function 120 ("$f_{1a}$") such that its function identifier(s) 220 specify "$f_{1a}$". In various embodiments, it is the current (caller) function's responsibility to release the memory resources that are associated with the data object 125 that is returned from the function call after its use terminates. But it is not always practical to make a copy of a data object 125 due to its size. As such, the reference to such a data object 125, often the memory address of the data object 125, may be returned/passed instead. In the case of being transferred, the memory resources associated with the returned/passed-in data object 125 are assigned to the receiving function 120. As an example, when data object 125 ("V2") is returned to function 120 ("$f_{1a}$"), function 120 ("$f_{1a}$") takes over the data object 125 ("V2"), although the data object 125 is assigned to a new variable name ("V1"). The memory resources of that data object 125 may be released when scope 310A terminates.

Figure 4B:
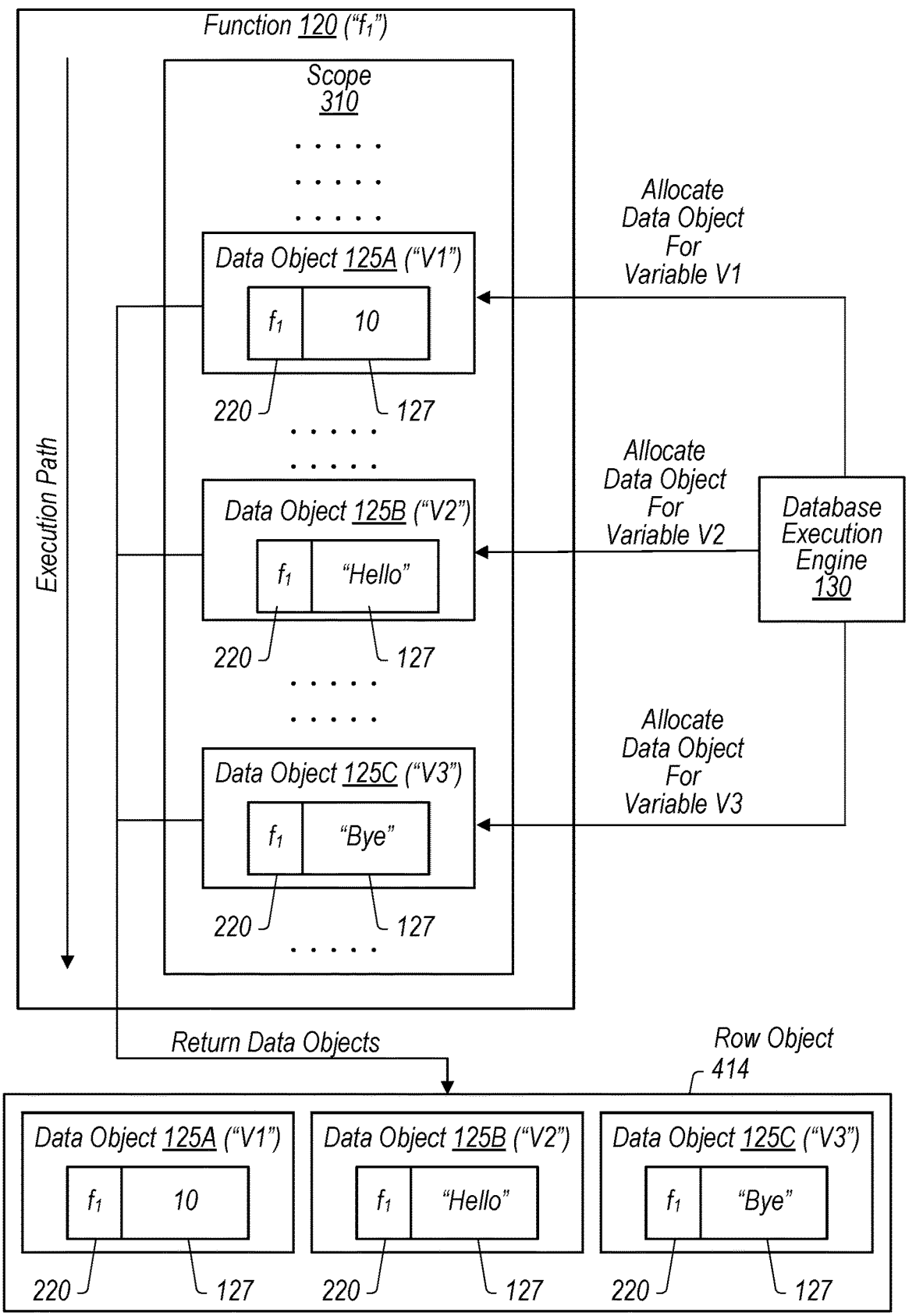
FIG. 4B is a block diagram illustrating example elements of managing a row object that includes a set of data objects, each having their own ownership information, according to some embodiments.

Turning now to FIG. 4B, a block diagram of an example row object 414 having multiple data objects 125A-C is shown. In the illustrated embodiment, there is a function 120 ("$f_1$") that includes a scope 310 and returns a row object 414. In various embodiments, the programming language used to build an application 110 permits functions 120 to return a set of values using a "return next" construct. The overall return value of a function 120 may thus be a collection, consisting of values obtained from return next statements defined in that function 120. In the illustrated embodiment, the execution of function 120 ("$f_1$") results in the instantiation of three variables V1, V2, and V3. As shown, database execution engine 130 allocates data objects 125A, 125B, and 125C for variables V1, V2, and V3, respectively, and they are returned to another function 120 as a row object 414 (a collection). A row object 414, in various embodiments, stores one or more values corresponding to one or more fields. Each value may be either by-value or by-reference. In the latter case, a row object 414 stores the memory address of the data object 125 that stores the value that is being referenced. In some embodiments, the initialization of a row object 414 involves the allocation of memory resources at system memory 140. Consequently, database execution engine 130 may allocate ownership information 129 for that row object 414.

But in various embodiments, each data object 125 within a row object 414 includes its own ownership information 129. As illustrated for example, data objects 125A-C each include their own respective function identifier 220 and data object value 127. If the function 120 that received row object 414 passed data object 125A as an input parameter into a different function 120, then data object 125A's ownership information 129 may be updated by database execution engine 130 to reference both functions 120. If data objects 125B and 125C are not passed in with data object 125A, then their ownership information 129 may not be updated. In some embodiments, a row object 414's ownership information 129 is updated when an underlying data object 125's ownership information 129 is updated—e.g., when data object 125A is passed into a different function 120, then data object 125A and the illustrated row object 414 are updated. But in other embodiments, a row object 414's ownership information 129 is not updated due to a change in the ownership information 129 of one of its underlying data object 125. While row objects 414 are discussed, a function 120 may return another type of composite value. The use of different ownership information 129 for a composite value (e.g., a row object 414) and its data objects 125 may be to compensate for more complex data types and sophisticated language constructs, such as wrapping a data object 125 within a record or returning a collection of values from a function 120.

Figure 5:
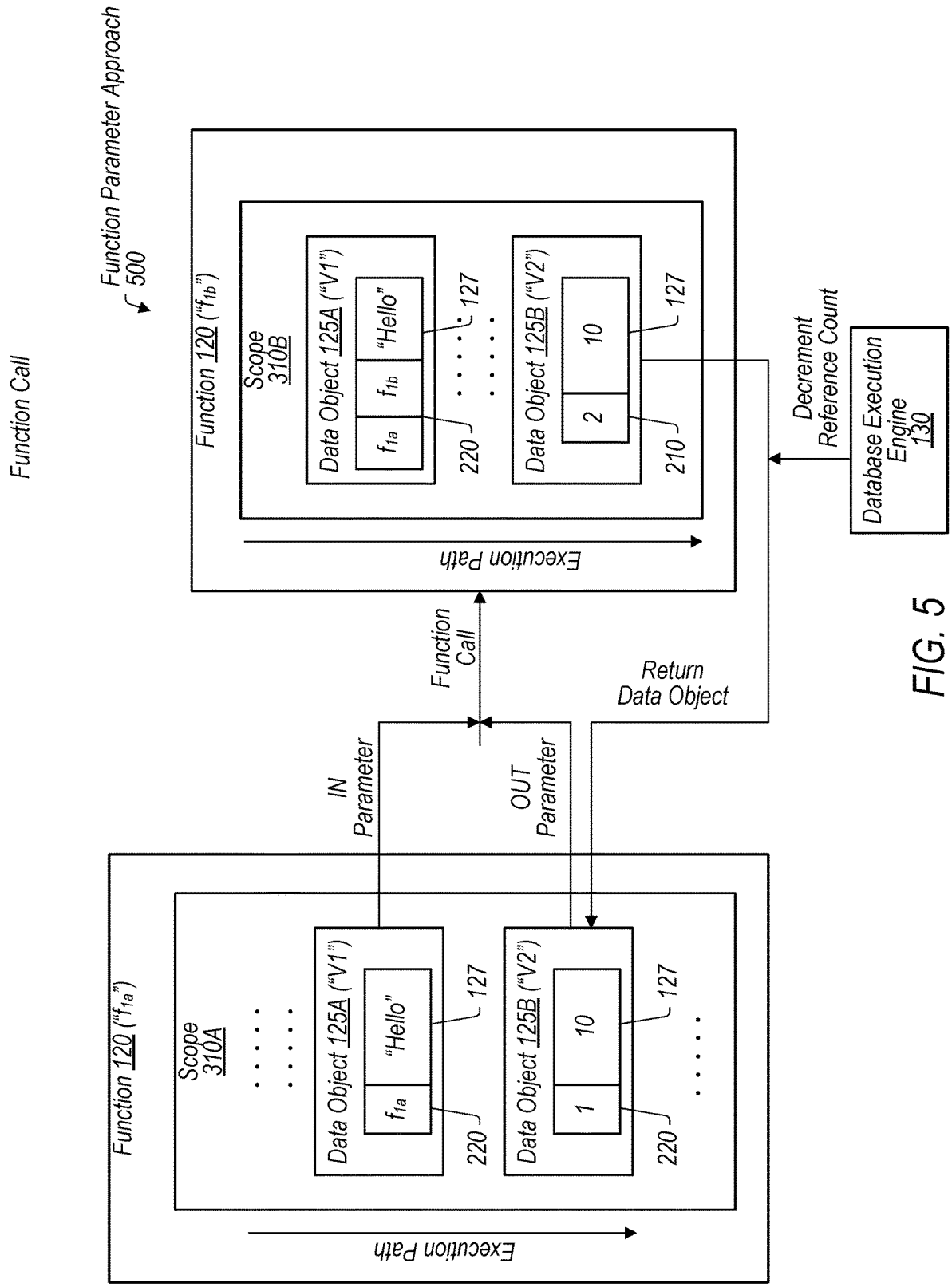
FIG. 5 is a block diagram illustrating example elements of managing a parameter data object that is passed into a function, according to some embodiments.

Turning now to FIG. 5, a block diagram of an example function parameter approach 500 for managing a parameter data object 125 is shown. In the illustrated embodiment, there are two functions: a function 120 ("$f_{1a}$") having a scope 310A and a function 120 ("$f_{1b}$") having a scope 310B. A function 120 may pass in a data object 125 or a collection of data objects 125 as a parameter to another function 120. In some embodiments, there are three parameter types: in parameters, out parameters, and inout parameters. An in parameter may be used within the receiving function 120 during its execution but not returned. An out parameter may be updated within the receiving function 120 during its execution and implicitly returned at the exit of that function 120. An inout parameter may serve as both an in parameter and an out parameter such that it is used, updated, and implicitly returned by the receiving function 120. As shown, data object 125A ("V1") is passed from function 120 ("$f_{1a}$") into function 120 ("$f_{1b}$") as in parameter while data object 125B ("V2") is passed from function 120 ("$f_{1a}$") into function 120 ("$f_{1b}$") as out parameter.

For a data object 125 that is passed in as an in parameter, in various embodiments, the ownership information 129 for that data object 125 is updated to reflect a shared ownership of that data object 125 by the function 120 that passed it and the function 120 that received it. As shown for example, data object 125A ("V1") is initially owned by function 120 ("$f_{1a}$"). When function 120 ("$f_{1b}$") is invoked by function 120 ("$f_{1a}$"), however, a use/reference on data object 125A ("V1") occurs at the callsite. As a result, a shared ownership of data object 125A ("V1") is established at the callsite such that data object 125A ("V1") references function 120 ("$f_{1a}$") and function 120 ("$f_{1b}$"). While function identifiers 220 are shown for data object 125A ("V1"), in some cases, data object 125A ("V1") includes a reference count 210 that indicates that there are two functions 120 utilizing data object 125A ("V1"). Accordingly, when data object 125A ("V1") is passed into function 120 ("$f_{1b}$"), database execution engine 130 may increment that reference count 210. When function 120 ("$f_{1b}$") completes, the ownership information 129 of data object 125A ("V1") may be updated to reflect that function 120 ("$f_{1b}$") no longer possesses ownership of data object 125A ("V1"). When function 120 ("$f_{1a}$") completes, database execution engine 130 may determine, based on the ownership information 129 of data object 125A ("V1"), that no other functions 120 are utilizing data object 125A ("V1") and may deallocate the memory resources allocated for data object 125A ("V1"). In some cases, for a data object 125 that is passed in as an in parameter, its ownership information 129 is not updated to reflect the receiving function 120.

In some embodiments, a particular trait is observed in the use of an in parameter, which is that it can serve as a local variable when it is updated. In particular, a data object 125 might be passed in as an in parameter to a function 120 via a reference to that data object 125. When an assignment is performed on that data object 125 by the receiving function 120, its underlying memory resources are not modified. Instead, a new data object 125 (but with the same variable name) may be allocated by database execution engine 130 in order to accommodate the newly assigned value. The function 120 (e.g., function 120 ("$f_{1a}$")) that passed in the original data object 125 maintains ownership of the data object 125 while the receiving function 120 (e.g., function 120 ("$f_{1b}$")) takes ownership of the new data object 125. As a result, an assignment may effectively define a new scope 310 for the parameter and that scope 310 may terminate when the receiving function 120 completes execution, just like a local variable earlier. If the parameter/variable is passed into another function 120 as a parameter, then shared ownership may be established at the callsite on the new data object 125. In some embodiments, when a data object 125 is passed in as an in parameter, database execution engine 130 creates a copy of that data object 125 but includes different ownership information 129 in that copy that indicates that the receiving function 120 is the owner of the copy. The receiving function 120 receives the copy but not the original data object 125.

For a data object 125 that is passed in as an out parameter, in various embodiments, the data object 125 is treated similar to a return value, as discussed earlier. In some embodiments, a row object 414 that includes all the out parameters is returned. Accordingly, when data object 125B ("V2") is passed in to function 120 ("$f_{1b}$") as an out parameter, its ownership information 129 may updated to reflect that function 120 ("$f_{1a}$") and function 120 ("$f_{1b}$") own it. When data object 125B ("V2") is returned to function 120 ("$f_{1a}$"), it may be returned as a data object 125 of a row object 414.

For a data object 125 that is passed in as an inout parameter, in various embodiments, its behavior is a combination of an in parameter and an out parameter. While in the receiving function 120, that data object 125 may be referenced and updated as a local variable and then returned via a row object 414. As discussed previously, at the callsite, shared ownership may be established on the data object 125 that is passed to the receiving function 120, and when the receiving function 120 completes, the ownership of the resources associated with the returned object is transferred to the calling function 120 at the callsite.

Figure 6:
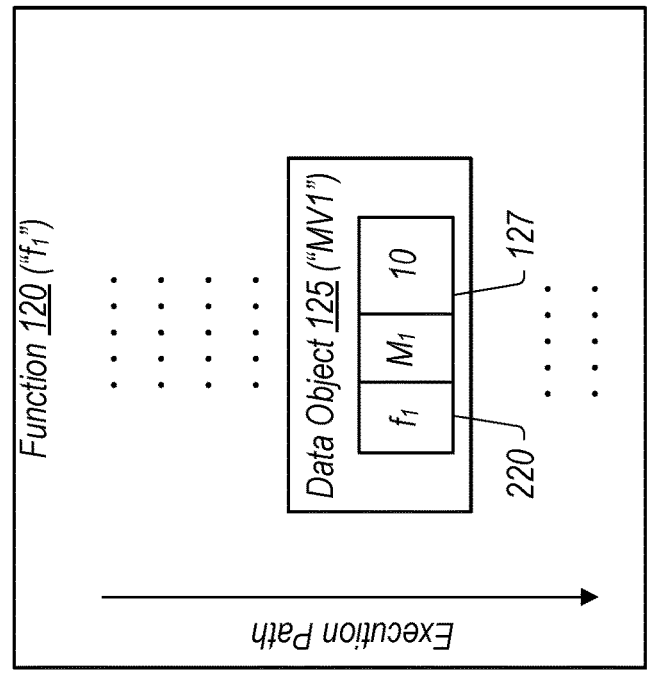
FIG. 6 is a block diagram illustrating example elements of managing a global data object, according to some embodiments.
Figure 6:
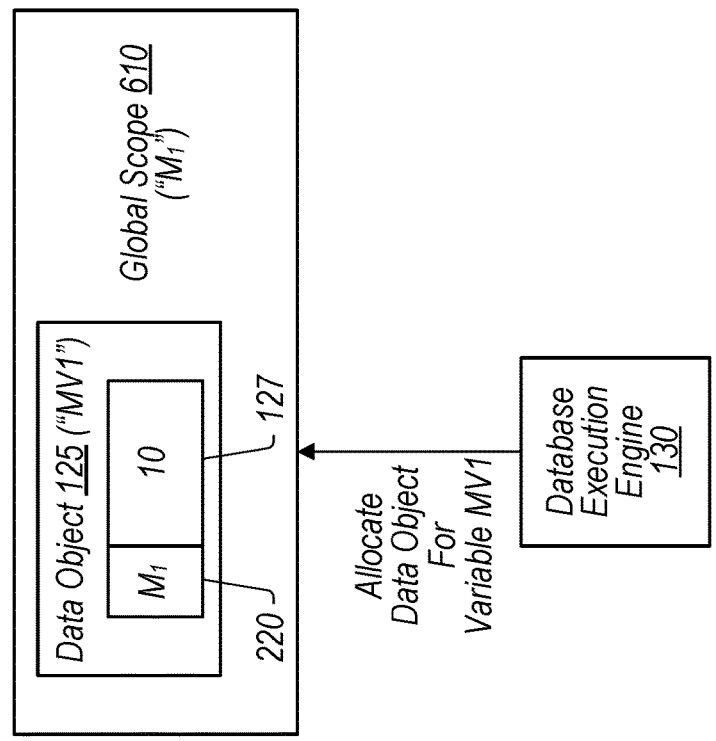

Turning now to FIG. 6, a block diagram of an example global variable approach 600 for managing a global data object 125 is shown. In the illustrated embodiment, there is a function 120 ("$f_1$"), a global scope 610 ("$M_1$"), and database execution engine 130. A global scope 610, in various embodiments, corresponds to a namespace that may be created under a schema. Functions 120, custom types, and data objects 125 may be created under a global scope 610. As shown for example, global scope 610 ("$M_1$") includes a data object 125 ("MV1") that comprises a data object value 127 (10) and a function identifier 220 that identifies global scope 610 ("$M_1$"). In various embodiments, a global data object 125 is initialized when its global scope 610 is initialized and the scope 310 of that data object 125 is determined by the lifecycle of its global scope 610. As a result, that global scope 610 owns the memory resources associated with that data object 125 and that data object 125 is destroyed when that global scope 610 ceases to exist.

When a global data object 125 is used/referenced, in various embodiments, shared ownership is established for that data object 125. As illustrated, when function 120 ("$f_1$") uses data object 125 ("MV1"), its ownership information 129 is updated to reflect that function 120 ("$f_1$") and global scope 610 ("$M_1$") possess data object 125 ("MV1"). While function identifiers 220 are shown, in various embodiments, a reference count 210 is used. As such, when a new owner is established, the reference count 210 is incremented; when an owner releases the data object 125, the reference count 210 is decremented. In various embodiments, when an assignment is applied to a global data object 125 and that assignment causes a new data object 125 to be created, then the existing ownership status is carried over from the former data object 125 and applied to the new data object 125 by database execution engine 130. The former data object 125 may then be deleted by database execution engine 130. Since the ownership status is carried over, the relevant global scope 610 may obtain ownership of the new data object 125. When returning a global data object 125, the shared ownership kept by the returning function 120 may be transferred to the callsite of the calling function 120.

Figure 7:
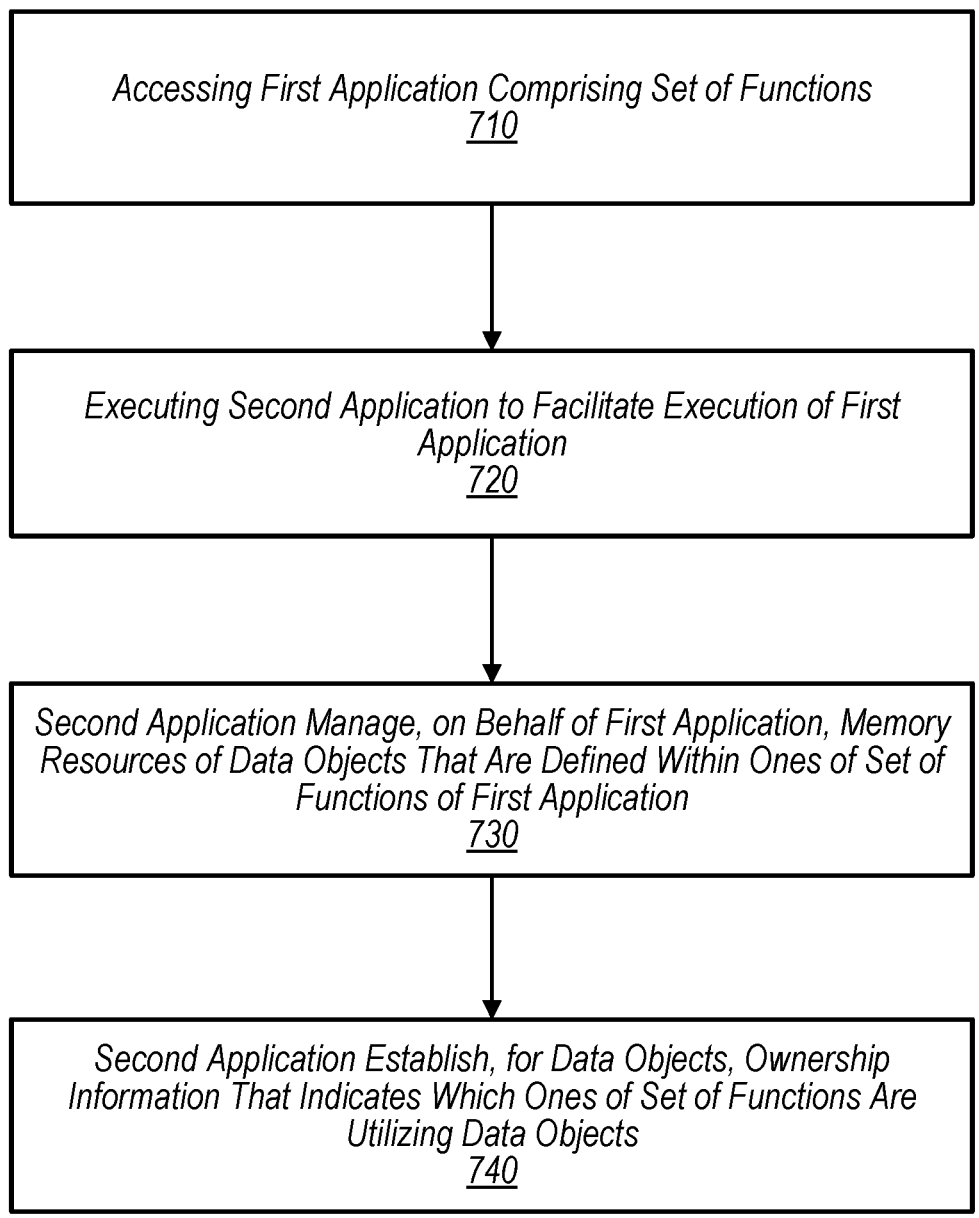
FIG. 7 is a flow diagram illustrating example method relating to managing data objects using ownership information, according to some embodiments.

Turning now to FIG. 7, a flow diagram of a method 700 is shown. Method 700 is one embodiment of a method performed by a computer system (e.g., system 100) for managing the data objects (e.g., data objects 125) that are provisioned for an application (e.g., an application 110). Method 700 can be performed by executing program instructions stored on a computer-readable medium. For example, a computer system having at least one processor may execute program instructions of a memory of that computer system to perform method 700. Method 700 may include more or less steps or a different ordering of steps that shown. For example, method 700 may include a step in which the computer system receives a request to execute an application (e.g., an application 110).

Method 700 begins in step 710 with the computer system accessing a first application (e.g., an application 110) comprising a set of functions (e.g., functions 120). In step 720, the computer system executes a second application (e.g., database execution engine 130) to facilitate the execution of the first application. In various embodiments, the first application is written in a different programming language than the second application.

In step 730, the second application manages, on behalf of the first application, memory resources (e.g., memory resources of system memory 140) of data objects (e.g., data objects 125) that are defined within ones of the set of functions of the first application. In step 740, the second application establishes, for those data objects, ownership information (e.g., ownership information 129) that indicates which ones of the set of functions are utilizing the data objects. In various embodiments, the ownership information is usable to determine, upon completion of a function of the set of functions, whether a given one of the data objects can be deallocated based on whether that data object is being utilized by another function of the set of functions. A portion of the ownership information (e.g., a reference count 210) corresponding to the given data object is stored in a memory resource (e.g., memory portion 205) allocated for storing one or more values of the given data object. In some instances, the particular object is a row data structure (e.g., a row object 414) that comprises a plurality of fields, and at least two separate values correspond to different fields. The ownership information of the row data object may indicate, for a given one of the at least two separate values, which ones of the set of functions are utilizing the given value. The computer system may detect that a function is assigning a value to the data object and then allocate an additional set of memory resources (e.g., another data object 125) to store the value. In various embodiments, the additional memory resources are associated with different ownership information than the ownership information associated with the data object.

In various embodiments, the ownership information may include, for a particular one of the data objects, a reference count (e.g., a reference count 210) that indicates a number of functions that are utilizing the particular data object. The particular data object may be passed into a first function (e.g., a function 120 ("$f_{1_b}$")) of the set of functions from a second function (e.g., a function 120 ("$f_{1_a}$")) of the set of functions such that both functions share the particular data object. Accordingly, the computer system increments the reference count to indicate that at least two functions are utilizing the particular data object. Later, the computer system may determine that the reference count indicates that there are no functions utilizing the particular data object and, in response to that determining, the computer system may reclaim a memory resource that was allocated for the particular data object.

In various embodiments, the ownership information may include, for a particular one of the data objects, a function identifier (e.g., a function identifier 220) that is used to identify a function that is utilizing the particular data object. The function identifier may be initially set to identify a first function of the set of functions. The particular data object might be returned from the first function to a second function of the set of functions. Based on the particular data object being returned to the second function, in various embodiments, the computer system updates the function identifier to identify the second function instead of the first function.

A copy of a particular one of the data objects may be passed into a first function of the set of functions from a second, different function of the set of functions. The computer system may generate additional ownership information that indicates which ones of the set of functions are utilizing the copy of the particular data object.

Exemplary Computer System

Figure 8:
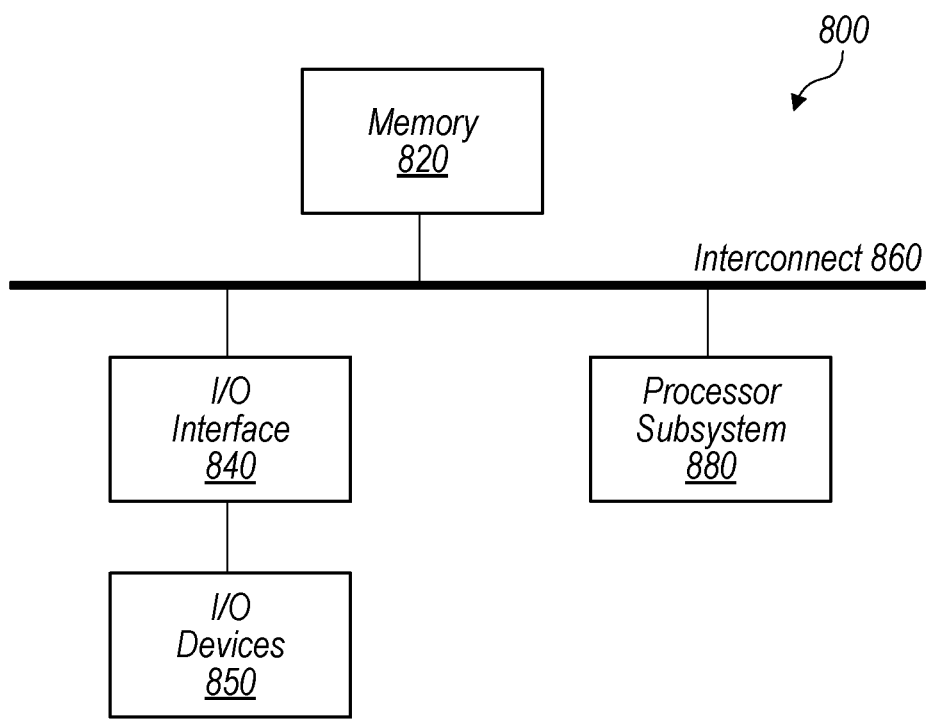
FIG. 8 is a block diagram illustrating elements of a computer system for implementing various systems described in the present disclosure, according to some embodiments.

Turning now to FIG. 8, a block diagram of an exemplary computer system 800, which may implement system 100 or system memory 140, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement applications 110 and/or database execution engine 130 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    accessing, by a computer system, a first application comprising a set of functions; and
    executing, by the computer system, a second application to facilitate execution of the first application, wherein the second application is operable to:
        manage, on behalf of the first application, memory resources of data objects defined within ones of the set of functions of the first application; and
        establish, for the data objects, ownership information that indicates which ones of the set of functions are utilizing the data objects, wherein the ownership information is usable to determine, upon completion of a function of the set of functions, whether a given one of the data objects can be deallocated based on whether the given data object is being utilized by another function of the set of functions.

2. The method of claim 1, wherein the ownership information includes, for a particular one of the data objects, a reference count indicating a number of functions utilizing the particular data object.

3. The method of claim 2, wherein the particular data object is passed into a first function of the set of functions from a second function of the set of functions, wherein the first function and second function share the particular data object, and wherein the method further comprises:
    incrementing, by the computer system, the reference count to indicate that at least two functions are utilizing the particular data object.

4. The method of claim 2, further comprising:
    determining, by the computer system, the reference count indicates there are no functions utilizing the particular data object; and
    in response to the determining, the computer system reclaiming a memory resource that was allocated for the particular data object.

5. The method of claim 1, wherein the ownership information includes, for a particular one of the data objects, a function identifier used to identify a function utilizing the particular data object within the first application.

6. The method of claim 5, wherein the function identifier is set to identify a first function of the set of functions, wherein the particular data object is returned from the first function to a second function of the set of functions, and wherein the method further comprises:
    based on the particular data object being returned to the second function, the computer system updating the function identifier to identify the second function instead of identifying the first function.

7. The method of claim 1, wherein a portion of the ownership information corresponding to the given data object is stored in a memory resource allocated for storing one or more values of the given data object.

8. The method of claim 1, wherein a particular one of the data objects comprises at least two separate values, and wherein the ownership information indicates, for a given one of the at least two separate values, which ones of the set of functions are utilizing the given value.

9. The method of claim 8, wherein the particular data object is a row data structure comprising a plurality of fields, and wherein the at least two separate values correspond to different fields of the plurality of fields.

10. The method of claim 1, wherein a copy of a particular one of the data objects is passed into a first function of the set of functions from a second function of the set of functions, and wherein the method further comprises:
    generating, by the computer system, additional ownership information indicating which ones of the set of functions are utilizing the copy of the particular data object.

11. A non-transitory computer readable medium having program instructions stored thereon that are capable of causing a computer system to perform operations comprising:
    accessing a first application comprising a set of functions; and
    executing a second application to facilitate execution of the first application, wherein the first application is written in a different programming language than the second application, wherein the second application is operable to:
        allocate, on behalf of the first application, a set of memory resources to a data object defined within one of the set of functions of the first application; and
        establish, for the data object, ownership information that indicates which ones of the set of functions are utilizing the data object, wherein the ownership information is usable to determine, upon completion of a first function of the set of functions, whether the data object is being utilized by a second function of the set of functions.

12. The medium of claim 11, wherein the ownership information includes a reference count indicating a number of functions utilizing the data object, and wherein the second application is operable to increment the reference count when the data object is provided as an input value into a particular function.

13. The medium of claim 12, wherein the second application is operable to:
    detect that the particular function is assigning a value to the data object; and
    allocate an additional set of memory resources to store the value, wherein the additional set of memory resources is associated with different ownership information than the ownership information associated with the data object.

14. The medium of claim 11, wherein the ownership information is stored within a header portion of the set of memory resources.

15. The medium of claim 11, wherein the data object is a row data structure that comprises a plurality of fields, and wherein the ownership information indicates, for a respective value of each field of the plurality of fields, which ones of the set of functions are utilizing the respective value.

16. A system, comprising:
   at least one processor; and
   memory having program instructions stored thereon executable by the at least one processor to cause the system to perform operations comprising:
      accessing a first application comprising a set of functions; and
      executing a second application to facilitate execution of the first application, wherein the first application is written in a different programming language than the second application, wherein the second application is operable to:
         manage, on behalf of the first application, memory resources of data objects defined within ones of the set of functions of the first application; and
         establish, for the data objects, ownership information that indicates which ones of the set of functions are utilizing the data objects, wherein the ownership information is usable to determine, upon completion of a function of the set of functions, whether a given one of the data objects can be deallocated based on whether the given data object is being utilized by another function of the set of functions.

17. The system of claim 16, wherein the ownership information includes, for a particular one of the data objects, a reference count indicating a number of functions utilizing the particular data object.

18. The system of claim 17, wherein the second application is operable to deallocate a set of memory resources allocated to the particular data object in response to determining that the reference count indicates that there are no functions utilizing the particular data object.

19. The system of claim 16, wherein the ownership information includes, for a particular one of the data objects, a function identifier that is used to identify a function that is utilizing the particular data object.

20. The system of claim 16, wherein a particular one of the data objects is a record having a plurality of values that correspond to a plurality of fields of a database table, and wherein the ownership information indicates, for each one of the plurality of values, which ones of the set of functions are utilizing that value.

* * * * *